United States Patent [19]

Nutz

[11] 4,158,164
[45] Jun. 12, 1979

[54] PHASE CONTROL OF POWER TO A LOAD USING A SINGLE CAPACITOR

[75] Inventor: Karl-Diether Nutz, Heilbronn, Fed. Rep. of Germany

[73] Assignee: Licentia Patent-Verwaltungs-G.m.b.H., Frankfurt, Fed. Rep. of Germany

[21] Appl. No.: 808,627

[22] Filed: Jun. 21, 1977

[30] Foreign Application Priority Data

Jun. 30, 1976 [DE] Fed. Rep. of Germany ....... 2629831

[51] Int. Cl.² ........................... G05F 1/44; H03K 4/08
[52] U.S. Cl. .................................. 323/24; 307/252 B; 307/262; 323/35; 323/39
[58] Field of Search ........................ 323/24, 34, 35, 36, 323/39, 228 C; 307/252 B, 252 T, 252 UA, 262, 294, 246

[56] References Cited

U.S. PATENT DOCUMENTS

| | | | |
|---|---|---|---|
| 3,243,689 | 3/1966 | Perrins | 323/24 |
| 3,932,771 | 1/1976 | Bucek et al. | 323/24 |
| 3,986,047 | 10/1976 | Griess | 323/24 |

*Primary Examiner*—Gerald Goldberg
*Attorney, Agent, or Firm*—Spencer & Kaye

[57] ABSTRACT

In the control of power supplied to a load from an a.c. power source by varying the phase angle of the a.c. power alternation at which conduction is initiated, conduction triggering pulses are generated by the use of a single capacitor which is first charged at a selected rate starting from a time corresponding to a predetermined phase angle of the a.c. power alternation, until the voltage thereacross reaches a first value, whereupon a triggering pulse is initiated, and the capacitor is then charged at a selected rate until the voltage thereacross reaches a second value, whereupon the triggering pulse is terminated.

5 Claims, 6 Drawing Figures

PHASE CONTROL OF POWER TO A LOAD USING A SINGLE CAPACITOR

BACKGROUND OF THE INVENTION

The present invention relates to a method for phase angle conduction control by means of a monolithically integrated circuit. The invention is particularly directed to circuits in which the instant of generation of the triggering pulse is determined by comparison, in a comparator, between a ramp voltage which is synchronized with the alternating supply, or mains, voltage and which is generated by means of an additionally connected capacitor fed from an internal constant current source of the circuit, and a variable threshold value.

Monolithically integrated phase angle controls are known, in particular for controlling conduction by triacs and thyristors, as disclosed in the German periodical "Elektronik", 1975, issue No. 7, pages 72–74. With the aid of such phase angle control the energy consumption of a load connected to the a.c. mains can be continuously varied by shifting the conduction triggering pulses applied to triacs or thyristors connected ahead of the load between mains voltage phase angles of 0° and 180°.

In the prior art, in order to generate triggering pulses in a monolithically integrated phase angle control circuit, a sawtooth generator with constant repetition frequency, which is preferably 100 Hz in a 50 Hz mains and 120 Hz in a 60 Hz mains, provides a voltage which linearly increases in time and the moment of onset of the triggering signal can then be shifted along this ramp by the action of a threshold value switch having a variable response threshold. At the instant when the voltage furnished by the sawtooth generator exceeds the selected response threshold, the threshold value switch activates an output stage which itself contains a pulse generator to produce one triggering pulse of the triggering pulse train. Known phase angle control circuits thus require two timers, i.e. one for the phase shifter to set the triggering instant and one to generate pulses in the output stage.

SUMMARY OF THE INVENTION

It is an object of the present invention to simplify and reduce the current consumption of circuitry for effecting conduction phase angle control and constituted by a monolithically integrated circuit.

A more specific object of the invention is to provide a method in which only one pulse per half period of a relatively short duration is required to trigger the triacs or the thyristors, respectively.

These and other objects are accomplished according to the invention, in a method of the above-described type, by causing the firing pulse to continue until the capacitor has been charged further so as to reach an internally determined reference voltage.

According to an advantageous embodiment of the method according to the invention, when the threshold value is reached, the capacitor is discharged via the comparator and simultaneously a storage flip-flop which provides the triggering pulse is set so that, on the one hand, a second constant current source is additionally connected to the capacitor and, on the other hand, the internally determined reference voltage is fed to the comparator, then the capacitor is charged by the two constant current sources, and when the reference voltage has been reached, the capacitor is again discharged via the comparator so that the storage flip-flop is reset and the second constant current source is switched off while the reference voltage remains at the comparator until the alternating supply, or mains, voltage and/or current pass through zero.

In a particular further embodiment of the method, the setting of the storage flip-flop enables the circuit output, particularly the output amplifier of the monolithically integrated circuit.

The above-described method requires only one time determining capacitor for the ramp voltage and the triggering pulse width. Additionally, the current consumption is reduced to a relatively great extent compared to the known method. Thus the total number of components required as well as their energy losses are reduced to a minimum in an advantageous manner.

DESCRIPTION OF THE PREFERRED EMBODIMENTS

Figure 1:
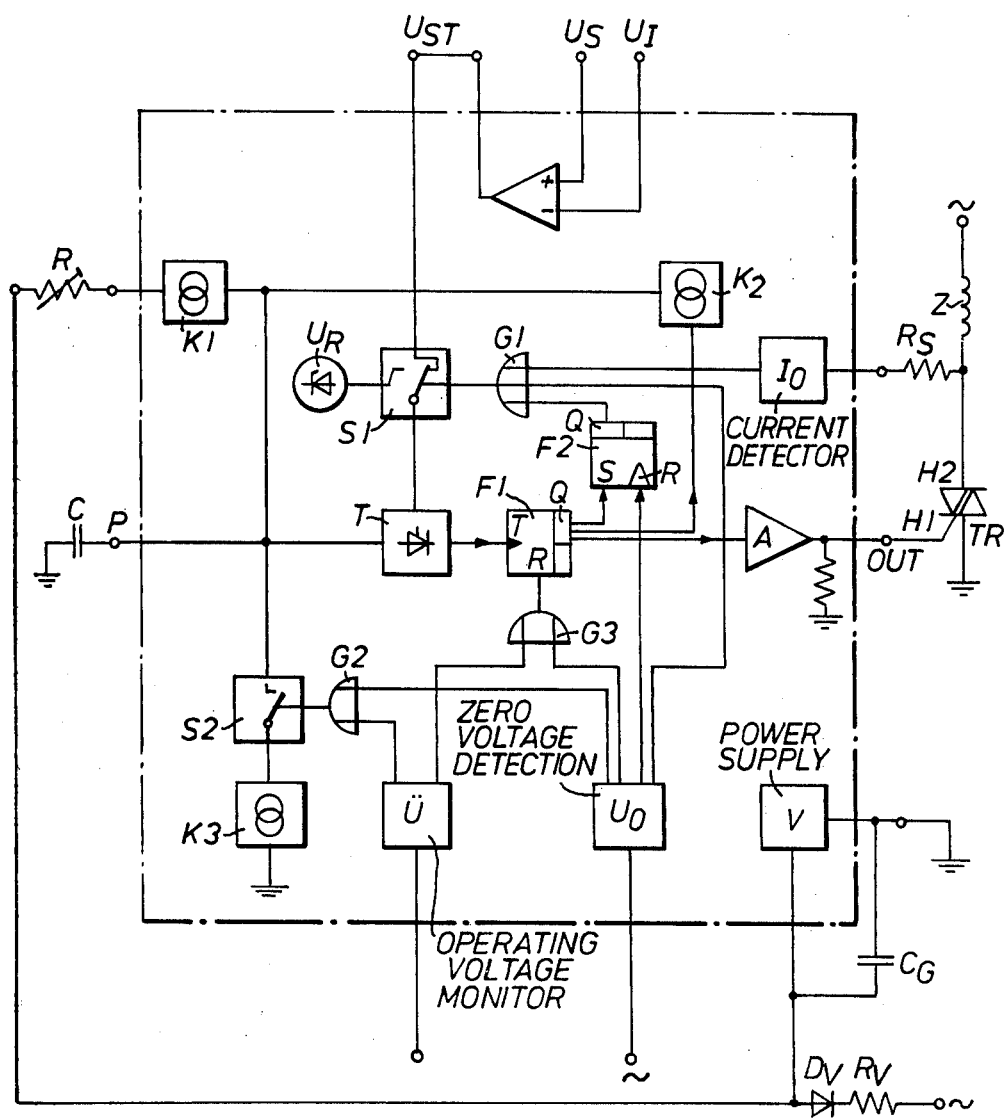
FIG. 1 is a block circuit diagram of one preferred embodiment of a circuit operating according to the invention.

The circuit shown in FIG. 1 includes, in a dot-dash outline, a monolithically integrated circuit for a phase angle control circuit. The circuit supplies triggering pulses via its output OUT, connected to an output amplifier A, to the control electrode $H_1$ of a triac or thyristor TR having its main electrode $H_2$ connected to a load Z and arranged to switch that load into a load circuit at the desired phase angle of each cycle of the supply voltage.

The d.c. operating voltage, or current supply for the integrated circuit is provided by a conventional integrated element V which is connected with the alternating voltage mains via a resistor $R_v$ and a diode $D_v$ serving to rectify the current coming from the alternating voltage mains. Element V has associated with it a conventional smoothing capacitor $C_G$. Element V which also serves to limit the voltage coming from the alternating voltage mains is connected to each circuit component requiring operating voltage in a conventional manner not illustrated in detail.

Externally connected with the input of the element V is a variable resistor R whose function is described below.

The circuit is further provided with a capacitor C connected between a terminal P and ground. In contrast with conventional circuits which require two separate RC members to shift the triggering pulses in phase and to adjust their pulse width, both functions are performed in an advantageous manner through the use of just this one capacitor.

Initially, the phase position of the triggering instant is determined in the known manner of a comparison between a ramp voltage synchronized with the alternating mains voltage and a given rated value. Capacitor C is discharged during the passage of the mains voltage through its zero value by the action of a zero voltage detector $U_0$, connected to monitor the mains voltage, an OR gate G2 having one input connected to an output of detector $U_0$ and a normally-open switch S2 connected between terminal P and ground via a constant current source K3 and connected to the output of gate G2 to be closed upon production of a zero passage pulse by detector $U_0$. Upon termination of the zero passage pulse, switch S2 opens and the capacitor C is charged from a constant current source K1 whose output current is adjustable externally via the variable resistor R to allow for the unavoidable tolerance of capacitor C.

A control voltage $u_{ST}$, which can be produced externally or can be derived on the basis of the difference between a rated voltage $u_S$ and an actual voltage $u_1$, respectively, is fed into the circuit via a switch S1 to define the threshold value which must be reached by the ramp voltage generated by charging of capacitor C so as to set the instant of triggering. Switch S1 is an electronically-controlled two position element one side of which can be connected to either one of two terminals. The terminal to which it is connected when no control signal is applied to the switch receives control voltage $u_{ST}$.

At the time the ramp voltage furnished by capacitor C reaches the given threshold value, a thyristor T, functioning as a comparator, is triggered into conduction to set an RST storage flip-flop F1 whose trigger input is connected to the thyristor T. The direct output Q of storage flip-flop F1 is connected to output amplifier A. Output Q of flip-flop F1 is also connected to control a second constant current source K2 connected to capacitor C in addition to the first constant current source K1. Output Q of flip-flop F1 is further connected to the set input of an RS flip-flop F2 whose Q output is connected to one input of an OR gate G1 having its output connected to the control input of switch S1. Upon setting of flip-flop F1, amplifier A produces an output which triggers element TR into conduction, second constant current source K1 is activated to supply a supplementary current to capacitor C, and flip-flop F2 is set to produce a signal at its Q output. The latter signal is conducted by OR gate G1 to the control input of switch S1 to switch its connection to the other one of the two terminals, which receives an internally generated reference voltage $u_R$ having a larger magnitude than $u_{ST}$, in the direction of increase of the voltage across capacitor C during charging.

Capacitor C is now charged by both constant current sources K1 and K2 until its voltage ($u_C$) has reached the value of reference voltage $u_R$. The duration of this charging process corresponds to the desired pulse width ($t_p$) of the output pulse, i.e. the triggering pulse. When the capacitor voltage reaches the value $u_R$, thyristor T is again triggered into conductions and sets the storage flip-flop F1 back to the starting state. The triggering pulse at terminal OUT is thus terminated and the constant current source K2 is switched off. RS flip-flop F2 continues to hold switch S1 so that the internal reference voltage $u_R$ remains present at the control input of thyristor T. The magnitude of $u_R$ is greater than the maximum magnitude of control voltage $u_{ST}$ so that the emission of more than one triggering pulse per half period of the mains voltage is dependably prevented. This is of particular significance because the energy content of the output pulse is greater than the inherent requirement of the circuit per half wave.

Upon the subsequent zero passage of the mains voltage, the zero passage detector $U_0$ reset RS flip-flop F2, discharges capacitor C, again via gate G2 and switch S2, and additionally assures, via an OR gate G3, that storage flip-flop F1 is reset to its desired starting state.

The circuit is also provided with a current detector $I_0$. When the load Z is inductive, the load current lags behind the mains voltage, which means that the trigger pulse generating circuit could furnish a triggering pulse, without taking consideration of the current, during the time when the current still flows with a polarity opposite to that of the mains voltage. That would lead to so-called "gaps" in the load current since the next triggering pulse would be generated only during the next following half wave.

Indications of whether load current is flowing or not can be furnished by the triac TR itself. If the triac is triggered, the voltage at main electrode H2 jumps from the momentary value of the mains voltage to the value of the forward conduction voltage of the triac. If the load current falls below the holding current of the triac, toward the end of the half wave the triac becomes nonconductive and the voltage at terminal H2 jumps back to the then momentary value of the mains voltage.

The current detector $I_0$ monitors the voltage at terminal H2 via a resistor $R_S$ and acts via gate G1 and switch S1 to block generation of trigger pulses by maintaining switch S1 connected to reference voltage $u_R$ as long as the triac TR is triggered.

Since under certain circumstances the triac, when connected to an ohmic load Z, may already turn off shortly before the zero passage of the mains voltage, when the current falls below the triac conduction holding current, the RS flip-flop F2 must prevent possible generation of a second triggering pulse.

An additional integrated element Ü is connected in the circuit to gates G2 and G3 so as to monitor the operating voltage of the circuit. Thus, as soon as the operating voltage of the circuit drops below a predetermined value, the element Ü via the OR gate G3 blocks the output of the triggering pulses from flip-flop F 1.

Figure 2A:
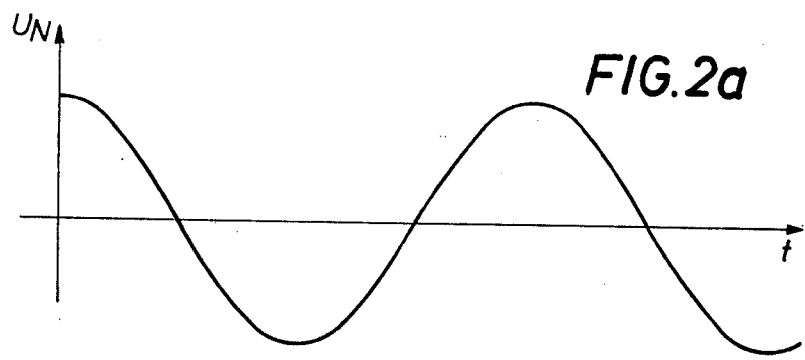
FIGS. 2a–2e are waveform diagrams illustrating the operation of the circuit of FIG. 1.
Figure 2B:
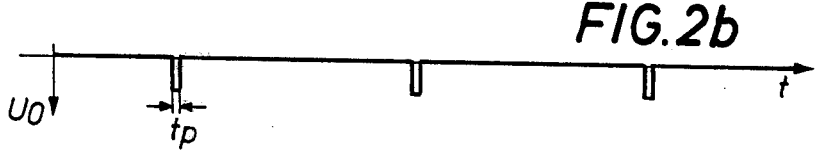
Figure 2C:
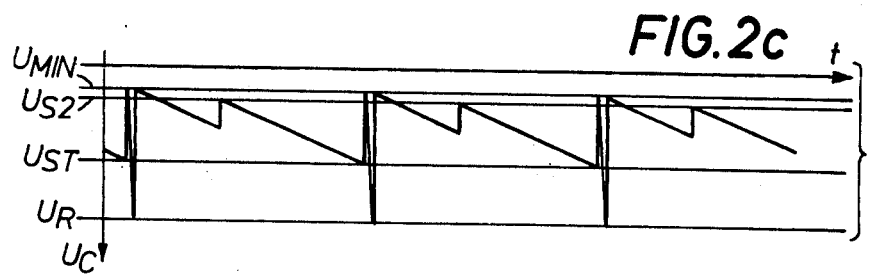

FIGS. 2a-2e illustrate the operation of the circuit, the mains voltage $u_N$ being shown in FIG. 2a. FIG. 2b shows the corresponding form of the output voltage, $u_0$, of zero detector $U_0$. This detector emits a pulse with a duration $t_{p0}$ during every zero passage of the mains voltage $u_N$. Upon the emission of this pulse, switch S2 is closed and capacitor C is discharged to a value $u_{S2}$, as shown in FIG. 2c, and then charged by constant current source K1 so that its voltage $u_C$ increases linearly until it reaches the value of the control voltage $u_{ST}$. Then follows the discharging of the capacitor C via thyristor T to a minimum value $u_{MIN}$ of the ramp voltage and renewed rapid charging by constant current sources K1 and K2 until the capacitor voltage $u_C$ has reached the value of the internally established reference voltage $u_R$ and renewed triggering of thyristor T lowers the capacitor voltage back to the value $u_{MIN}$. The value of $u_R$ is always selected to be of larger magnitude than the maximum settable control voltage $u_{ST}$.

Figure 2D:
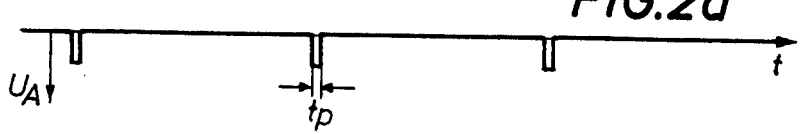

Between the latter two described dischargings of capacitor C to voltage $u_{MIN}$, the circuit furnishes the desired triggering pulse to the control electrode of the triac as a voltage pulse $u_A$ having duration $t_p$, as shown in FIG. 2d.

Figure 2E:
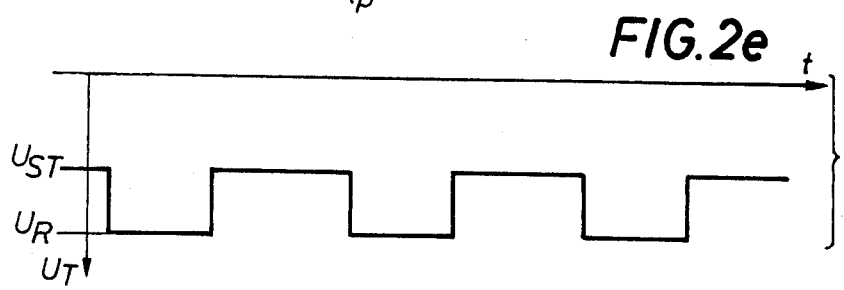

To clarify the voltage curves, the control voltage $u_T$ applied to the control electrode of thyristor T is plotted with respect to time t in FIG. 2e.

While switches S1 and S2 are designated in FIG. 1 by mechanical switch symbols to aid comprehension, it will be appreciated that in monolithically integrated circuit embodiments of the invention, they are constituted by suitable electronic units constructed according to well-known practices in the art.

A detailed description of one embodiment of the current detector $I_0$ as well as of the zero voltage detector $U_0$ is disclosed in the German Offenlegungsschrift No. 25 53 764.

Element Ü is a well-known in the art threshold value switch with a Zener-diode.

It will be understood that the above description of the present invention is susceptible to various modifications, changes and adaptations, and the same are intended to be comprehended within the meaning and range of equivalents of the appended claims.

What is claimed is:

1. In a method for producing phase angle conduction control triggering pulses in an integrated circuit to control the delivery of current to a load from an a.c. mains, including generating a constant current having a first value in a source forming part of the circuit, supplying the constant current to a capacitor forming part of the circuit to generate thereacross a ramp voltage synchronized with the a.c. mains voltage, comparing the ramp voltage with an adjustable threshold value in a comparator forming part of the circuit and initiating a triggering pulse when the ramp voltage reaches the threshold value, the improvement comprising: charging the same capacitor after initiation of the triggering pulse and terminating the pulse when the capacitor voltage equals a reference voltage generated within the circuit.

2. A method as defined in claim 1 wherein said step of initiating a triggering pulse comprises discharging the capacitor and simultaneously setting a storage flip-flop to produce the triggering pulse at the flip-flop output, said step of charging is carried out by causing the setting of the flip-flop to connect a second constant current source to the comparator while simultaneously connecting a source of the reference voltage to the comparator for causing the capacitor to be charged by current from the two constant current sources, and said step of terminating the triggering pulse comprises causing the capacitor to discharge through the comparator to reset the flip-flop and terminate current flow from the second source when the capacitor voltage equals the reference voltage, and thereafter continuing to apply the reference voltage to the comparator until at least one of the mains voltage and current passes through its zero value.

3. A method as defined in claim 2 comprising inhibiting initiation of an output pulse until the storage flip-flop is set.

4. A method as defined in claim 1 wherein said step of initiating a triggering pulse includes discharging the capacitor.

5. A monolithically integrated circuit for producing phase angle conduction control triggering pulses to control the delivery of current to a load from an a.c. mains, comprising: a single storage capacitor; a comparator having one input connected to receive the voltage across said capacitor; a flip-flop having a trigger input connected to the output of said comparator and arranged to have each pulse applied to its trigger input effect complementing of the output state of said flip-flop; current source means connected for charging said capacitor to produce a ramp voltage synchronized with the a.c. mains voltage; voltage source means connected to the other input of said comparator such that said comparator produces an output pulse each time the ramp voltage reaches a value determined by the voltage at the other input, said voltage source means providing an adjustable threshold value voltage and a reference voltage, and including means controlled by said flip-flop for initially applying the threshold value voltage to the other input of said comparator, and for then applying the reference voltage to the other input of said comparator and initiating recharging of said capacitor, after said comparator has delivered an output pulse to said flip-flop while the threshold value voltage was being applied to the other input of said comparator.

* * * * *